United States Patent
Sawano

(10) Patent No.: US 7,636,865 B2
(45) Date of Patent: Dec. 22, 2009

(54) INFORMATION PROCESSING APPARATUS AND METHOD OF SETTING FREQUENCY OF CLOCK TO BE SUPPLIED FROM PROCESSOR

(75) Inventor: Yasuaki Sawano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 540 days.

(21) Appl. No.: 11/466,196

(22) Filed: Aug. 22, 2006

(65) Prior Publication Data

US 2007/0050656 A1  Mar. 1, 2007

(30) Foreign Application Priority Data

Aug. 26, 2005  (JP) .............................. 2005-246433

(51) Int. Cl.
*G06F 1/12* (2006.01)
(52) U.S. Cl. ................. 713/400; 713/500; 713/501
(58) Field of Classification Search ............... 713/400, 713/500, 501
See application file for complete search history.

(56) References Cited

U.S. PATENT DOCUMENTS 6,076,171 A * 6/2000 Kawata .................. 713/501
6,175,929 B1 * 1/2001 Hsu et al. ............... 713/500

FOREIGN PATENT DOCUMENTS

| CN | 1372189 | 10/2002 |
|----|---------|---------|
| JP | 06-083476 | 3/1994 |
| JP | 09-319458 | 12/1997 |

* cited by examiner

*Primary Examiner*—Thomas Lee
*Assistant Examiner*—Matthew S Dori
(74) *Attorney, Agent, or Firm*—Cowan, Liebowitz & Latman, P.C.

(57) ABSTRACT

An information processing apparatus includes a processor, and a detector to detect the operation clock frequency set for a unit connected to a bus. The frequency of a clock to be supplied from the processor is set in accordance with the detected clock frequency.

11 Claims, 6 Drawing Sheets

INFORMATION PROCESSING APPARATUS AND METHOD OF SETTING FREQUENCY OF CLOCK TO BE SUPPLIED FROM PROCESSOR

BACKGROUND OF THE INVENTION

1. Field of the Invention

The present invention relates to an information processing apparatus and a method of setting the frequency of a clock to be supplied from a processor.

2. Description of the Related Art

Conventionally, for an information processing apparatus, a method of automatically resetting clock frequency upon upgrading the CPU has been proposed (e.g., Japanese Patent Application Laid-Open No. 06-083476). With this method, in an information processing apparatus capable of changing the CPU clock frequency, data about the CPU clock frequency, which is supplied from an external storage device, is written in a specific storage means of the information processing apparatus. A corresponding clock is generated on the basis of the data in the storage means and replaced with the conventional clock, thereby resetting the clock frequency.

In addition, a method of easily generating a system clock optimum for a system from a predetermined clock has been proposed (e.g., Japanese Patent Application Laid-Open No. 09-319458). With this method, the frequency division ratio of clock frequency division is stored in a rewritable storage means, the frequency of a clock generated by a generation means is detected, and the frequency division ratio stored in the storage means is rewritten in correspondence with the detected clock frequency.

In the above-described prior art, however, if a plurality of information processing apparatuses having different operable clock frequencies are connected to a single bus such as a PCI bus, the clock frequencies cannot be reset easily.

More specifically, when all information processing apparatuses can operate at 66 MHz, the clock frequency is reset to 66 MHz. However, if an information processing apparatus compatible with only 33-MHz operation is added after setting, the remaining information processing apparatuses cannot be changed to 33-MHz operation.

SUMMARY OF THE INVENTION

It is an object of the present invention to set an appropriate external bus clock in accordance with an external system connected to an external bus.

It is another object of the present invention to provide an information processing apparatus comprising processing means, detection means for detecting an operation clock frequency set for a unit connected to a bus, and setting means for setting, in accordance with the clock frequency detected by the detection means, a frequency of a clock to be supplied from the processing means.

It is still another object of the present invention to provide a method of setting a frequency of a clock to be supplied from a processor, comprising steps of detecting an operation clock frequency set for a unit connected to a bus, and setting, in accordance with the detected clock frequency, the frequency of the clock to be supplied from the processor.

Further features of the present invention will become apparent from the following description of exemplary embodiments with reference to the attached drawings.

DESCRIPTION OF THE EMBODIMENTS

Preferred embodiments to practice the present invention will be described below in detail with reference to the accompanying drawings.

First Embodiment

Figure 1:
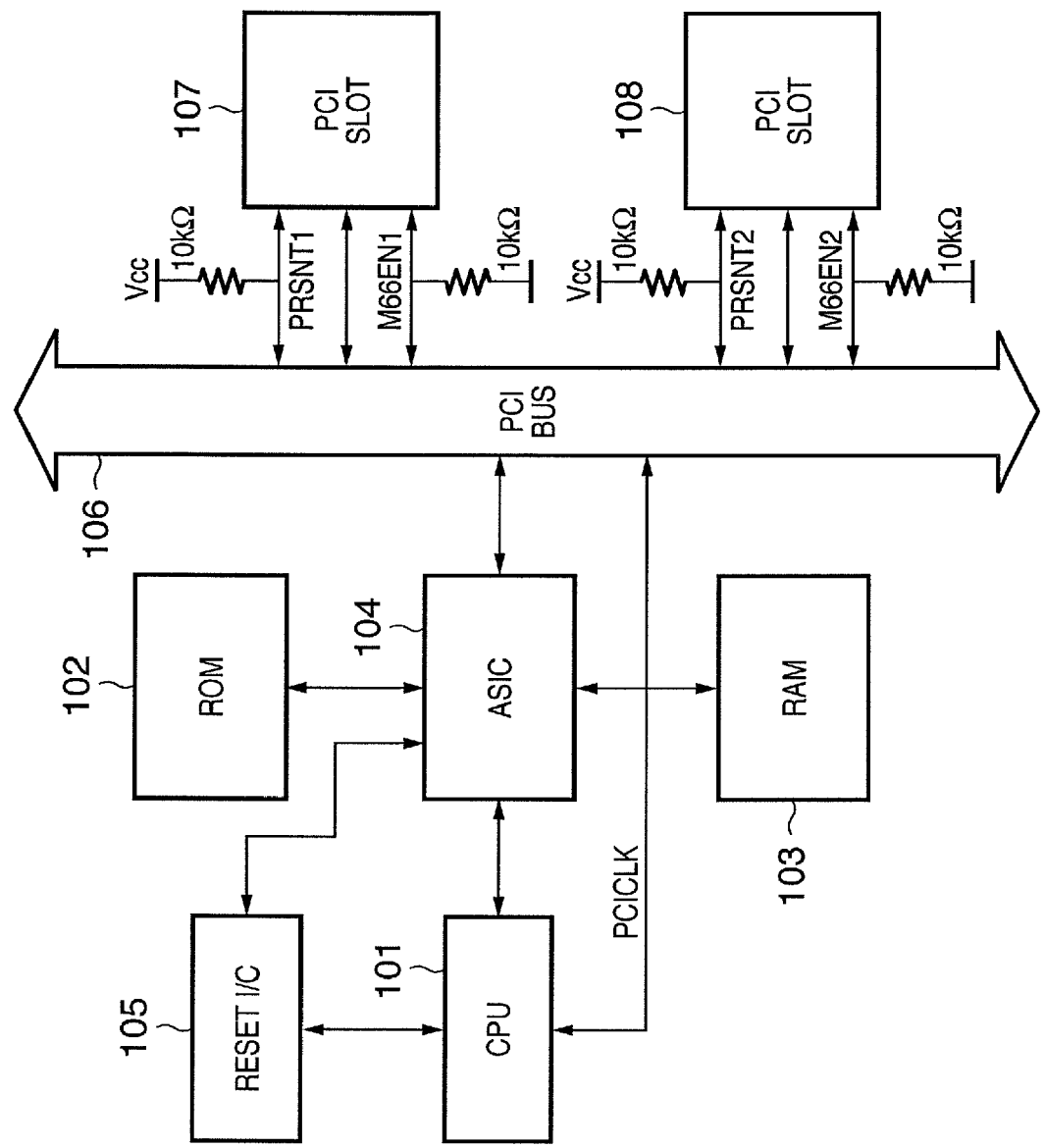
FIG. 1 is a block diagram showing the arrangement of an information processing apparatus according to the first embodiment.

FIG. 1 is a block diagram showing the arrangement of an information processing apparatus according to the first embodiment. Referring to FIG. 1, a CPU 101 executes predetermined processing in accordance with a program stored in a ROM 102 and outputs PCICLK in accordance with the system clock (PCICLK here) frequency setting stored in the ROM 102. The frequency setting is 33-MHz operation by default. The ROM 102 is formed from a rewritable nonvolatile memory (e.g., flash memory). A RAM 103 functions as a work memory used by the CPU 101 to execute control.

An ASIC 104 functions as an external clock setting (M66EN1 and M66EN2) detection means and also as an interface (I/F) between the CPU 101, ROM 102, RAM 103, and PCI bus 106. The ASIC 104 issues a reset request to a reset IC 105 in accordance with a reset instruction from the CPU 101. The reset IC 105 resets the CPU 101 in response to the reset request from the ASIC 104.

The PCI bus 106 connects the ASIC 104 to PCI slots 107 and 108 and includes the clock setting signals M66EN1 and M66EN2 and PCI option connection signals PRSNT1 and PRSNT2. The clock setting signals M66EN1 and M66EN2 enable the 66-MHz operation at high level and the 33-MHz operation at low level. The PCI option connection signals PRSNT1 and PRSNT2 indicate disconnection at high level and connection at low level.

The CPU 101 can confirm the signal levels of the clock setting signals M66EN1 and M66EN2 and PCI option connection signals PRSNT1 and PRSNT2 through the ASIC 104. When nothing is connected to the PCI slots 107 and 108, ground is connected to each of M66EN1 and M66EN2 through a 10-kO pull-down resistance. Hence, the CPU 101 can confirm through the ASIC 104 that the signal levels of M66EN1 and M66EN2 are low. When nothing is connected to the PCI slots 107 and 108, a power supply voltage Vcc is connected to each of PRSNT1 and PRSNT2 through a 10-kO pull-up resistance. Hence, the CPU 101 can confirm through the ASIC 104 that the signal levels of PRSNT1 and PRSNT2 are high. Note that the ASIC 104 is compatible with the 66-MHz operation of PCICLK.

Figure 2:
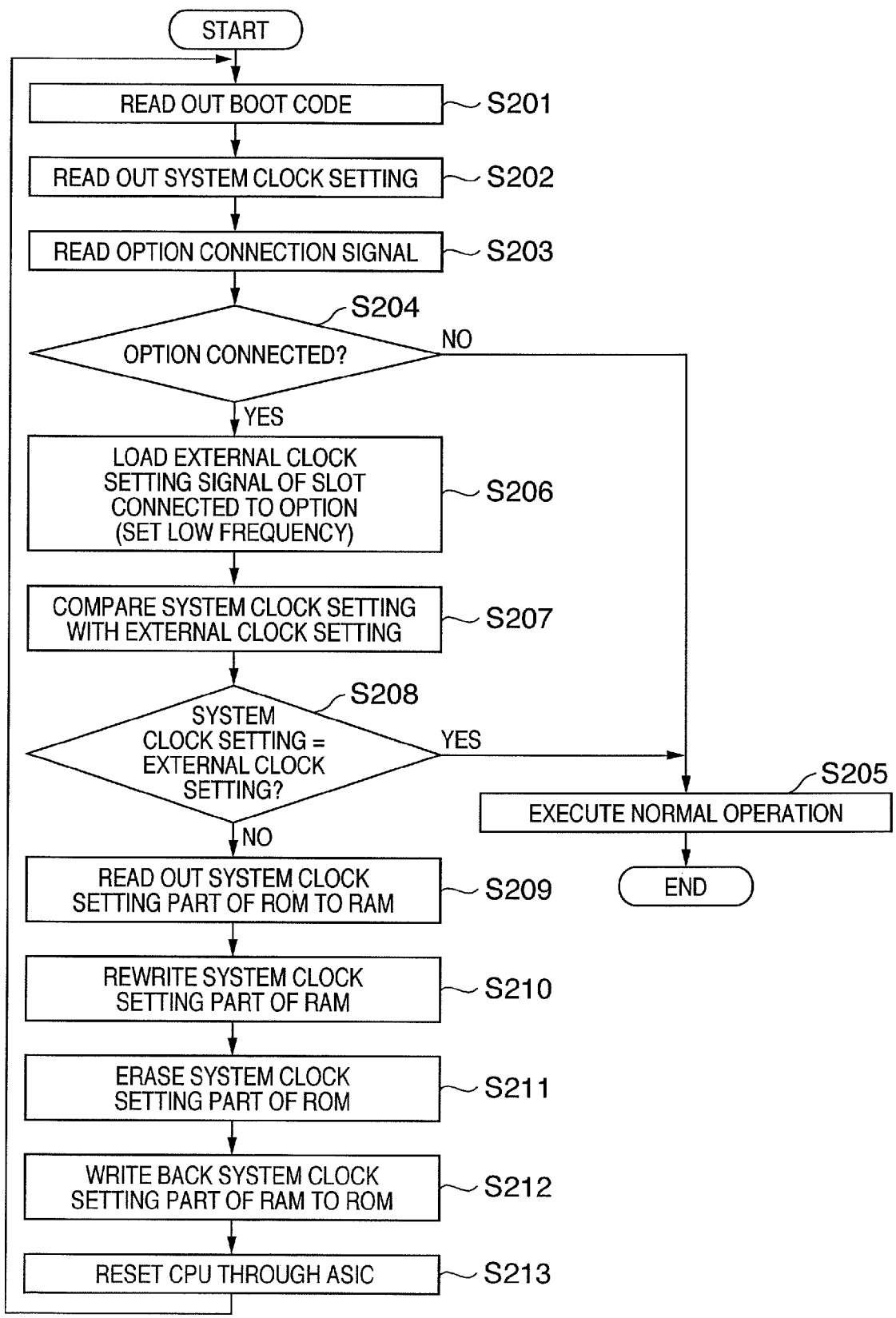
FIG. 2 is a flowchart showing the operation of the information processing apparatus according to the first embodiment.

An operation of resetting the system clock when an option is connected to the PCI slot of the information processing apparatus shown in FIG. 1 will be described next with reference to FIGS. 2 to 4. FIG. 2 is a flowchart showing the operation of the information processing apparatus according to the first embodiment.

A power switch (not shown) is turned on. In step S201, the CPU 101 reads out a boot code from the ROM 102 through the ASIC 104 and starts predetermined processing. In step S202, the CPU 101 reads out system clock setting from the ROM 102 through the ASIC 104. The system clock setting is the 33-MHz operation. In step S203, the CPU 101 loads, through the ASIC 104, the option connection signals (PRSNT1 and PRSNT2) of the PCI slots 107 and 108 connected to the PCI bus 106. In the example shown in FIG. 1, the signal levels of both PRSNT1 and PRSNT2 are confirmed to be high.

In step S204, the CPU 101 determines whether options are connected to the PCI slots 107 and 108. In the example shown in FIG. 1, since it is confirmed in step S203 that the signal levels of PRSNT1 and PRSNT2 are high, it is determined that no options are connected to the PCI slots 107 and 108. As a result, the flow advances to step S205. The CPU 101 supplies PCICLK of 33 MHz and executes predetermined processing as the normal operation.

Figure 3:
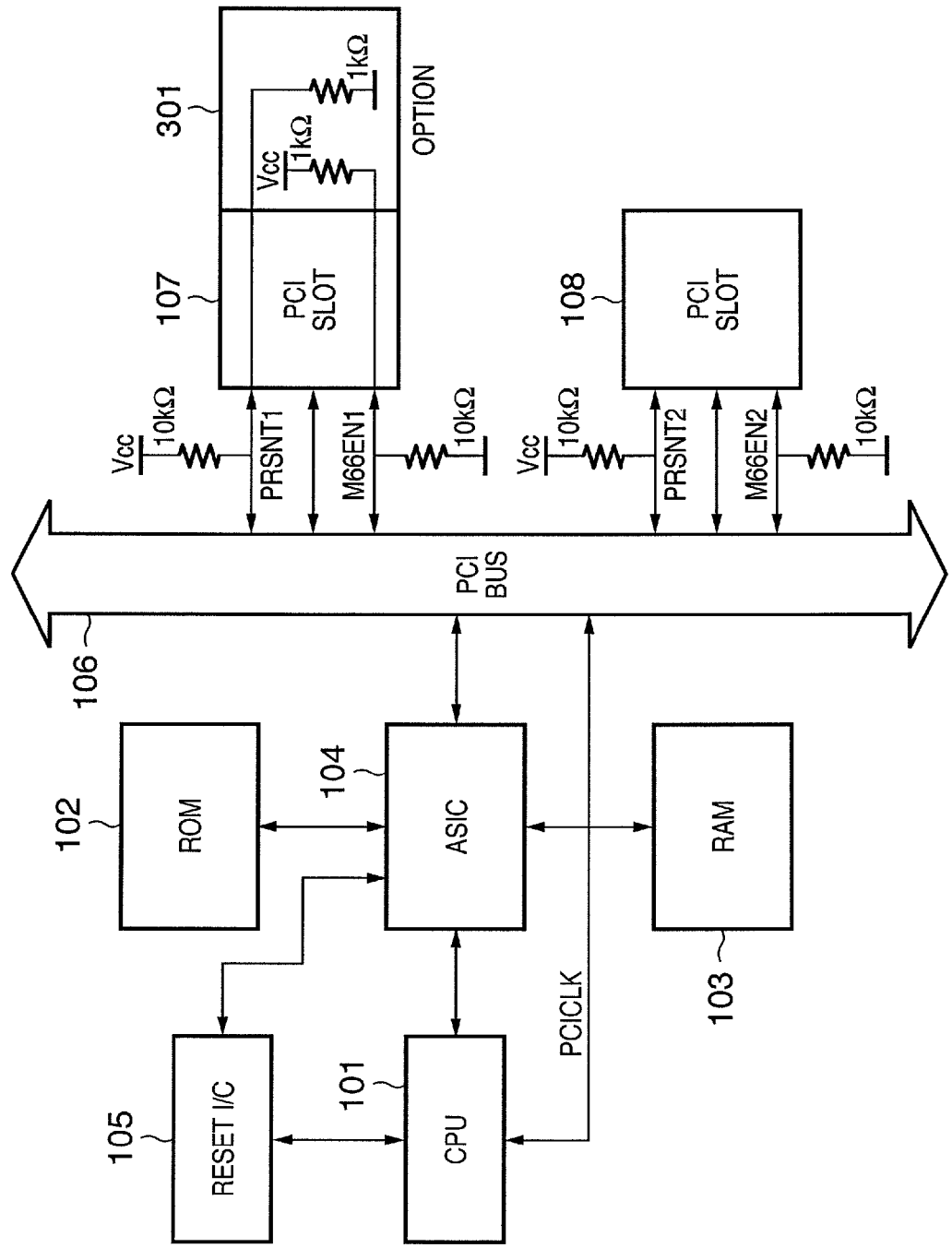
FIG. 3 is a view showing a state wherein an option 301 is connected to a PCI slot 107 of the information processing apparatus.

A case wherein an option 301 is connected to the PCI slot 107 of the information processing apparatus as shown in FIG. 3 (a case wherein the state in FIG. 1 changes to the state in FIG. 3 during OFF of the power switch) will be described.

FIG. 3 is a view showing a state wherein the option 301 is connected to the PCI slot 107 of the information processing apparatus. As shown in FIG. 3, M66EN1 is connected to the power supply voltage Vcc through a 1-kO pull-up resistance in the option 301. The arrangement that connects M66EN1 to the power supply voltage Vcc through the 1-kO pull-up resistance indicates that the option 301 can perform the 66-MHz operation. PRSNT1 is connected to ground through a 1-kO pull-down resistance in the option 301. The operation of the information processing apparatus shown in FIG. 3 will be described below with reference to the flowchart in FIG. 2.

The operations in steps S201 and 203 have already been described. The system clock is set for the 33-MHz operation. In step S203, the CPU 101 reads, through the ASIC 104, the option connection signals (PRSNT1 and PRSNT2) of the PCI slots 107 and 108 connected to the PCI bus 106. In the example shown in FIG. 3, it can be confirmed that the signal level of PRSNT1 is low while that of PRSNT2 is high.

In step S204, the CPU 101 determines whether options are connected to the PCI slots 107 and 108. Since it is confirmed in step S203 that the signal level of PRSNT1 is low, the CPU 101 determines that the option 301 is connected to the PCI slot 107. The flow advances to step S206 to load the external clock setting signal (M66EN1) of the slot (PCI slot 107) connected to the option 301. In the example shown in FIG. 3, it is determined that the signal level of M66EN1 is high, and the option 301 can perform the 66-MHz operation.

In step S207, system clock setting is compared with external clock setting. The system clock setting read out from the ROM 102 is 33 MHz. The external clock setting is 66 MHz. In step S208, it is determined that the system clock setting does not match the external clock setting, and the flow advances to step S209.

In the first embodiment, the rewritable nonvolatile memory is assumed to be a flash ROM. Normally, erase and write of a flash ROM are done for each of a plurality of divided storage areas. In step S209, all storage areas to be rewritten are copied to the RAM 103. In step S210, of the contents copied to the RAM 103, a system clock setting part is rewritten to the 66-MHz operation. In step S211, corresponding storage areas are erased. In step S212, the contents of the RAM 103 are written back to the ROM 102.

In step S213, the CPU 101 issues a reset instruction to the reset IC 105 through the ASIC 104. With this operation, the CPU 101 is reset, and the flow returns to step S201.

In step S201 after reset, the CPU 101 reads out the boot code from the ROM 102 through the ASIC 104 and starts predetermined processing. Note that the ROM 102 has been rewritten in step S212 before reset. In step S202, the CPU 101 reads out system clock setting from the ROM 102 through the ASIC 104. The system clock setting stored in the ROM 102 has been rewritten to the 66-MHz operation. In step S203, the CPU 101 loads, through the ASIC 104, the option connection signals (PRSNT1 and PRSNT2) of the PCI slots 107 and 108 connected to the PCI bus 106. In the example shown in FIG. 3, it is confirmed that the signal level of PRSNT1 is low while that of PRSNT2 is high.

In step S204, the CPU 101 determines whether options are connected to the PCI slots 107 and 108. In this case, it is determined that the option 301 is connected to the PCI slot 107. As a result, the flow advances to step S206 to load the external clock setting signal (M66EN1) of the slot (PCI slot 107) connected to the option 301. In the example shown in FIG. 3, it is determined that the signal level of M66EN1 is high, and the option 301 can perform the 66-MHz operation.

In step S207, system clock setting is compared with external clock setting. Both the system clock setting read out from the ROM 102 and the external clock setting are 66 MHz. In step S208, it is determined that the system clock setting matches the external clock setting. As a result, the flow advances to step S205. The CPU 101 supplies PCICLK of 66 MHz to execute predetermined processing.

Figure 4:
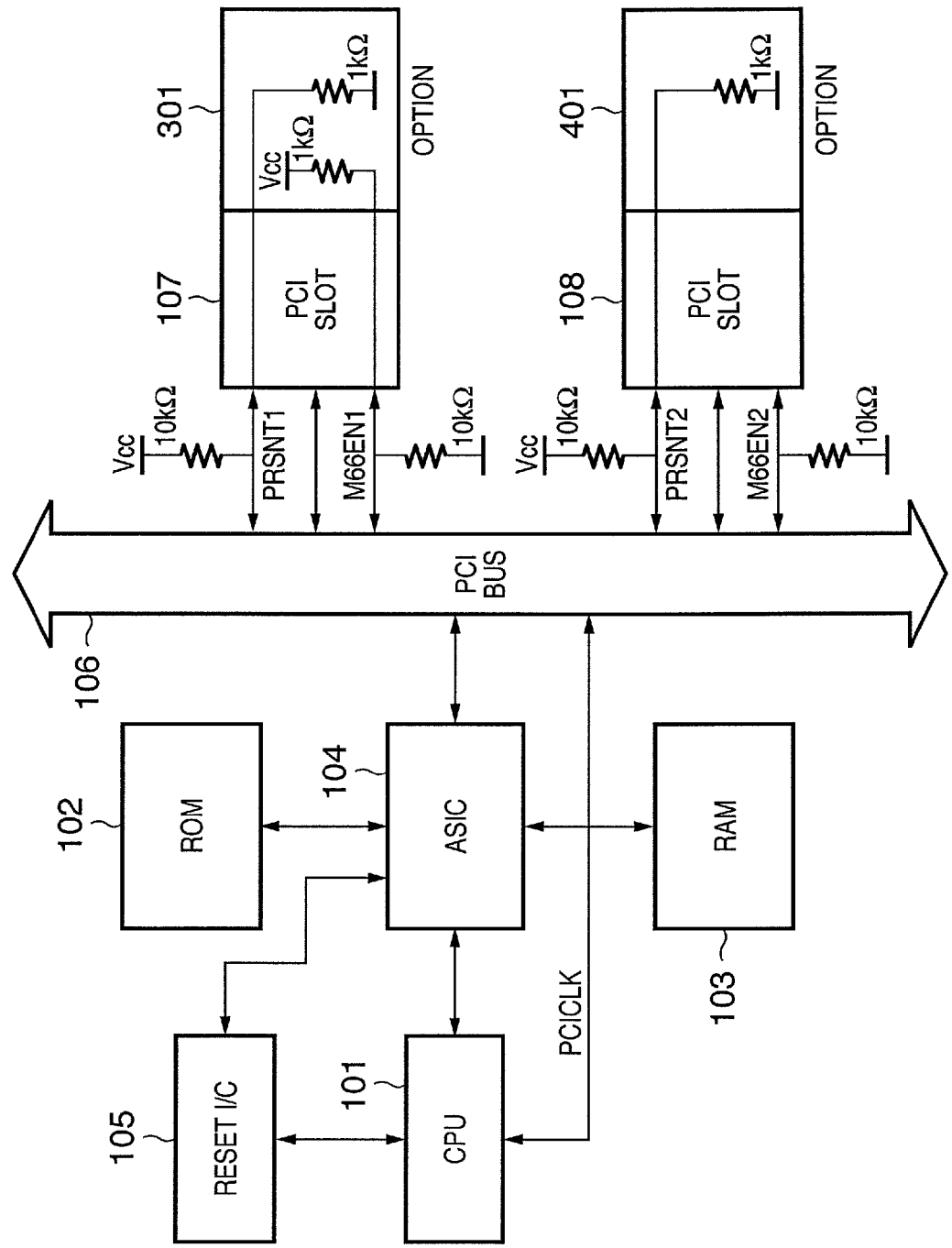
FIG. 4 is a view showing a state wherein an option 401 is connected to a PCI slot 108 of the information processing apparatus.

A case wherein an option 401 is connected to the PCI slot 108 of the information processing apparatus as shown in FIG. 4 (a case wherein the state in FIG. 3 changes to the state in FIG. 4 during OFF of the power switch) will be described.

FIG. 4 is a view showing a state wherein the option 401 is connected to the PCI slot 108 of the information processing apparatus. As shown in FIG. 4, PRSNT2 is connected to ground through a 1-kO pull-down resistance in the option 2. The operation of the information processing apparatus shown in FIG. 4 will be described below with reference to the flowchart in FIG. 2. The option 401 has no arrangement that connects M66EN2 to the power supply voltage Vcc through a 1-kO pull-up resistance. This indicates that the option 401 can perform the 33-MHz operation.

The power switch (not shown) is turned on. In step S201, the CPU 101 reads out the boot code from the ROM 102 through the ASIC 104 and starts predetermined processing. In step S202, the CPU 101 reads out system clock setting from the ROM 102 through the ASIC 104. As described with reference to FIG. 3, the option 301 is already connected, and the system clock setting stored in the ROM 102 has been rewritten to the 66-MHz operation. In step S203, the CPU 101 loads, through the ASIC 104, the option connection signals (PRSNT1 and PRSNT2) of the PCI slots 107 and 108 connected to the PCI bus 106. In the example shown in FIG. 4, the signal levels of both PRSNT1 and PRSNT2 are confirmed to be low.

In step S204, the CPU 101 determines whether options are connected to the PCI slots 107 and 108. Since it is confirmed in step S203 that the signal levels of PRSNT1 and PRSNT2 are low, the CPU 101 determines that options are connected to the PCI slots 107 and 108. The flow advances to step S206 to load the external clock setting signals (M66EN1 and M66EN2) of the slots (PCI slots 107 and 108) connected to the options. In the example shown in FIG. 4, it is confirmed that the signal level of M66EN1 is high while that of M66EN2 is low. Hence, it is determined that the option 301 can perform the 66-MHz operation, and the option 401 can perform the 33-MHz operation.

In step S207, system clock setting is compared with external clock setting. In this embodiment, a comparison target, which has a lower frequency of the two external clock settings, is compared with the system clock setting. Hence, the comparison target is 33 MHz of the option 401. The system clock setting read out from the ROM 102 is 66 MHz. The external clock setting of the option 401 is 33 MHz. In step S208, it is determined that the system clock setting does not match the external clock setting, and the flow advances to step S209.

In step S209, all storage areas to be rewritten are copied to the RAM 103, as described above. In step S210, of the contents copied to the RAM 103, a system clock setting part is rewritten to the 33-MHz operation. In step S211, corresponding storage areas are erased. In step S212, the contents of the RAM 103 are written back to the ROM 102.

In step S213, the CPU 101 issues a reset instruction to the reset IC 105 through the ASIC 104. With this operation, the CPU 101 is reset, and the flow returns to step S201.

In step S201 after reset, the CPU 101 reads out the boot code from the ROM 102 through the ASIC 104 and starts predetermined processing. In step S202, the CPU 101 reads out system clock setting from the ROM 102 through the ASIC 104. The system clock setting stored in the ROM 102 has been rewritten to the 33-MHz operation. In step S203, the CPU 101 loads, through the ASIC 104, the option connection signals (PRSNT1 and PRSNT2) of the PCI slots 107 and 108 connected to the PCI bus 106. In the example shown in FIG. 4, the signal levels of both PRSNT1 and PRSNT2 are confirmed to be low.

In step S204, the CPU 101 determines whether options are connected to the PCI slots 107 and 108. In this case, it is determined that options are connected to the PCI slots 107 and 108. As a result, the flow advances to step S206 to load the external clock setting signals (M66EN1 and M66EN2) of the slots (PCI slots 107 and 108) connected to the options. In the example shown in FIG. 4, it is confirmed that the signal level of M66EN1 is high while that of M66EN2 is low. Hence, it is determined that the option 301 can perform the 66-MHz operation, and the option 401 can perform the 33-MHz operation.

In step S207, system clock setting is compared with external clock setting. A comparison target, which has a lower frequency of the two external clock settings, is compared with the system clock setting. Hence, the comparison target is 33 MHz of the option 401. Both the external clock setting and the system clock setting read out from the ROM 102 are 33 MHz. In step S208, it is determined that the system clock setting matches the external clock setting. As a result, the flow advances to step S205. The CPU 101 supplies PCICLK of 33 MHz to execute predetermined processing.

As described above, according to the first embodiment, when a plurality of information processing apparatuses having different operable clock frequencies are connected to a single bus such as a PCI bus, the clock frequencies can be reset flexibly.

More specifically, when all information processing apparatuses can operate at 66 MHz, the clock frequency is reset to 66 MHz. Even when an information processing apparatus compatible with only 33-MHz operation is added after setting, the remaining information processing apparatuses can be changed to the 33-MHz operation.

Second Embodiment

The second embodiment of the present invention will be described next in detail with reference to the accompanying drawings.

Figure 5:
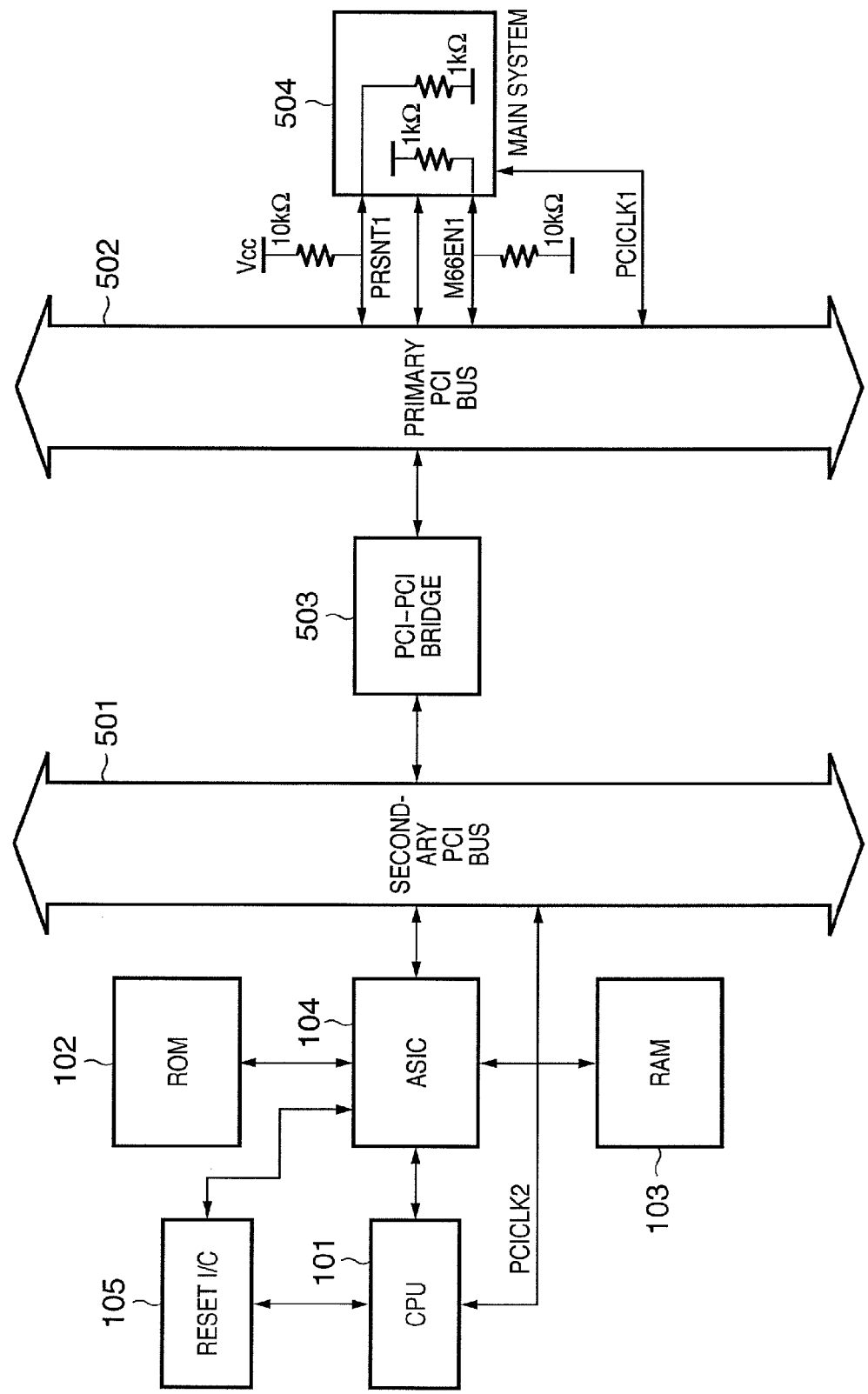
FIG. 5 is a block diagram showing the arrangement of an information processing apparatus according to the second embodiment.

FIG. 5 is a block diagram showing the arrangement of an information processing apparatus according to the second embodiment. The same reference numerals as in FIGS. 1, 3, and 4 denote parts having the same functions in FIG. 5, and a description thereof will be omitted. Referring to FIG. 5, both a primary PCI bus 502 and a secondary PCI bus 501 are PCI buses. A PCI-PCI bridge 503 bridges the primary PCI bus 502 and secondary PCI bus 501. A main system 504 includes a CPU, ROM, and RAM, and a detailed description thereof will be omitted.

In FIG. 5, the main system 504 is connected to the primary PCI bus 502 by signals PRSNT1 and M66EN1 connected to the main system 504. The main system 504 is configured to perform the 66-MHz operation. Hence, PCICLK1 of 66 MHz is supplied from the main system 504. A CPU 101 can detect the levels of the signals PRSNT1 and M66EN1 of the primary PCI bus 502 through an ASIC 104, secondary PCI bus 501, and PCI-PCI bridge 503.

Figure 6:
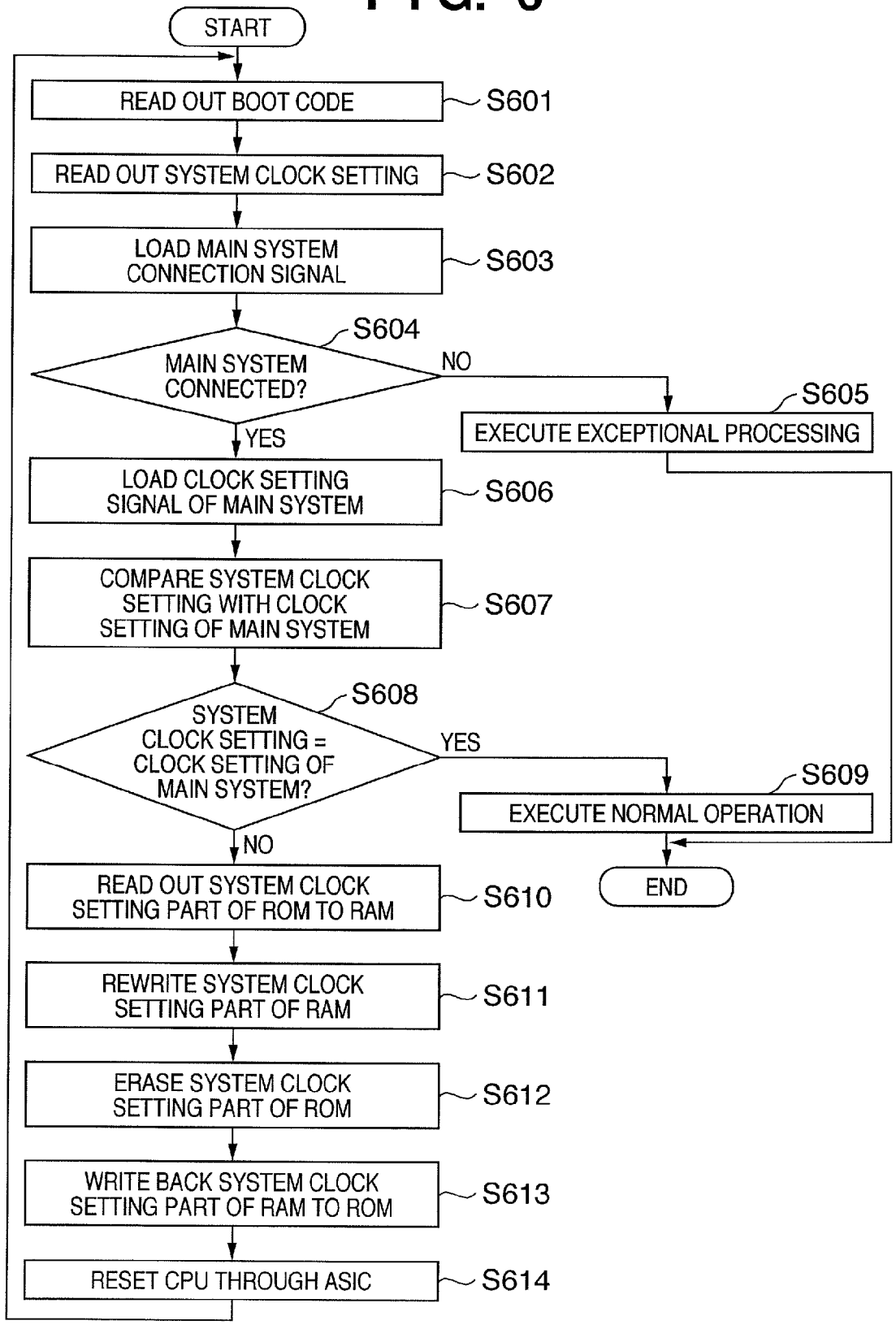
FIG. 6 is a flowchart showing the operation of the information processing apparatus according to the second embodiment.

The operation of the information processing apparatus (the operation of the CPU 101) shown in FIG. 5 will be described next with reference to FIG. 6. FIG. 6 is a flowchart showing the operation of the information processing apparatus according to the second embodiment.

A power switch (not shown) is turned on. In step S601, the CPU 101 reads out a boot code from a ROM 102 through the ASIC 104 and starts predetermined processing. The main system 504 starts an operation independently of the CPU 101. In step S602, the CPU 101 reads out system clock setting from the ROM 102 through the ASIC 104. The system clock setting is the 33-MHz operation. In step S603, the CPU 101 loads, through the ASIC 104, secondary PCI bus 501, and PCI-PCI bridge 503, the signal PRSNT1 that represents whether the main system 504 is connected to the primary PCI bus 502. In this case, the signal level of PRSNT1 is confirmed to be low.

In step S604, the CPU 101 determines whether the main system 504 is connected. Since it is confirmed in step S603 that the signal level of PRSNT1 is low, it is determined that the main system 504 is connected. The flow advances to step S606. If it is determined that the main system 504 is not connected, the flow advances to step S605 to cause the CPU 101 to execute exceptional processing.

In step S606, the clock setting signal (M66EN1) of the main system 504 is loaded. In the example shown in FIG. 5, it is determined that the signal level of M66EN1 is high, and the main system 504 operates at 66 MHz. In step S607, system clock setting is compared with the clock setting of the main system 504. The system clock setting read out from the ROM 102 is 33 MHz. The clock setting of the main system 504 is 66 MHz. In step S608, it is determined that the system clock setting does not match the clock setting of the main system 504. The flow advances to step S610 to rewrite the system clock part of the ROM 102.

Processing in steps S610 to S614 is the same as in steps S209 to S213 in FIG. 2, and a description thereof will be omitted.

If it is determined in step S608 that the system clock setting matches the clock setting of the main system 504, the flow advances to step S609 to execute the normal operation.

As described above, according to the second embodiment, even when system clock setting does not match the clock setting of the main system, the clock frequency can be reset easily. For example, when the main system side has a low frequency, performance can be maintained at low power consumption without increasing the cost. When the main system side has a high frequency, the high-speed operation can be implemented by setting the same frequency without increasing the cost.

The present invention may be applied to a system including a plurality of devices (e.g., a host computer, interface device, reader, and printer) or an apparatus including a single device (e.g., a copying machine or facsimile apparatus).

The object of the present invention is achieved even by supplying a recording medium which records software program codes to implement the functions of the above-described embodiments to the system or apparatus and causing the computer (or CPU or MPU) of the system or apparatus to read out and execute the program codes stored in the recording medium.

In this case, the program codes read out from the recording medium implement the functions of the above-described embodiments by themselves, and the recording medium which stores the program codes constitutes the present invention.

As the recording medium to supply the program codes, for example, a hard disk, optical disk, magnetooptical disk, CD-ROM, CD-R, magnetic tape, nonvolatile memory card, or ROM can be used.

The functions of the above-described embodiments are implemented not only when the readout program codes are executed by the computer but also when the OF (Operating System) running on the computer performs part or all of actual processing on the basis of the instructions of the program codes.

The functions of the above-described embodiments are also implemented when the program codes read out from the recording medium are written in the memory of a function expansion board inserted into the computer or a function expansion unit connected to the computer, and the CPU of the function expansion board or function expansion unit performs part or all of actual processing on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-246433, filed on Aug. 26, 2005, which is hereby incorporated by reference herein in its entirety.

What is claimed is:

1. An information processing apparatus comprising:
processing means;
connection means for connecting an option unit to a bus;
detection means for detecting an operation clock frequency set for a the option unit connected to the bus; and
setting means for setting, in accordance with the operation clock frequency detected by said detection means, a frequency of a clock to be supplied from said processing means;
wherein said processing means supplies the information processing apparatus with the clock of the frequency set by said setting means; wherein said setting means comprises storage means for storing the frequency of the clock supplied from said processing means, and said setting means stores the operation clock frequency detected by said detection means in said storage means in a case where the clock frequency stored in said storage means does not match the operation clock frequency detected by said detection means.

2. The apparatus according to claim 1, wherein said setting means comprises storage means for storing the frequency of the clock supplied from said processing means, and said setting means resets said processing means in a case where the clock frequency stored in said storage means does not match the operation clock frequency detected by said detection means.

3. The apparatus according to claim 1, wherein said setting means comprises storage means for storing the frequency of the clock supplied from said processing means, and said processing means supplies a clock of the frequency stored in said storage means.

4. The apparatus according to claim 1, wherein said setting means sets the frequency of the clock to be supplied from said processing means in accordance with a lower one of operation clock frequencies set for two option units connected to the bus.

5. An information processing apparatus comprising:
a primary bus;
a secondary bus;
bridge means for connecting the primary bus and the secondary bus;
connection means for connecting a main system to the primary bus;
processing means connected to the secondary bus;
detection means for detecting an operation clock frequency set for the main system connected to the primary bus, said detection means being connected to the secondary bus; and
setting means for setting, in accordance with the operation clock frequency detected by said detection means, a frequency of a clock to be supplied from said processing means connected to the secondary bus,
wherein said processing means supplies the information processing apparatus with the clock of the frequency set by said setting means; wherein said setting means comprises storage means for storing the frequency of the clock supplied from said processing means, and said setting means stores the operation clock frequency detected by said detection means in said storage means in a case where the clock frequency stored in said storage means does not match the operation clock frequency detected by said detection means.

6. A method of setting a frequency of a clock to be supplied from a processor of an information processing apparatus, comprising:
a detection step of detecting an operation clock frequency set for a an option unit connected to a bus;
and a setting step of setting, in accordance with the detected operation clock frequency, the frequency of the clock to be supplied from the processor; wherein the processor supplies the information processing apparatus with the clock of the frequency set in the setting step;

wherein in the setting step, the frequency of the clock supplied from the processor is stored, and the detected operation clock frequency is stored in a case where the stored clock frequency does not match the detected operation clock frequency.

7. The method according to claim 6, wherein in the setting step, the frequency of the clock supplied from the processor is stored, and the processor is reset in a case where the stored clock frequency does not match the detected operation clock frequency.

8. The method according to claim 6, wherein in the setting step, the frequency of the clock supplied from the processor is stored, and the processor supplies a clock of the stored frequency.

9. The method according to claim 6, wherein in the setting step, the frequency of the clock to be supplied from the processor is set in accordance with a lower one of operation clock frequencies set for two option units connected to the bus.

10. A method of setting a frequency of a clock to be supplied from a processor of an information processing apparatus, the method comprising:
   a detection step of detecting, at a secondary bus, an operation clock frequency set for a main system connected to a primary bus; and
   a setting step of setting, in accordance with the detected operation clock frequency, the frequency of the clock to be supplied from the processor connected to the secondary bus,
   wherein the processor supplies the information processing apparatus with the clock of the frequency set in the setting step;
   wherein in the setting step, the frequency of the clock supplied from the processor is stored, and the detected operation clock frequency is stored in a case where the stored clock frequency does not match the detected operation clock frequency.

11. A computer-readable recording medium that stores a computer program for causing a computer to execute a method of setting a frequency of a clock to be supplied from a processor of an information processing apparatus, the method comprising:
   a detection step of detecting an operation clock frequency set for an option unit connected to a bus; and
   a setting step of setting, in accordance with the detected operation clock frequency, the frequency of the clock to be supplied from the processor wherein the computer supplies the information processing apparatus with the clock of the frequency set in the setting step;
   wherein in the setting step, the frequency of the clock supplied from the processor is stored, and the detected operation clock frequency is stored in a case where the stored clock frequency does not match the detected operation clock frequency.

* * * * *